(12) United States Patent
Zheng

(10) Patent No.: US 12,445,413 B2
(45) Date of Patent: Oct. 14, 2025

(54) TECHNIQUES FOR APPLYING A NAMED PORT SECURITY POLICY

(71) Applicant: VMware, Inc., Palo Alto, CA (US)

(72) Inventor: Xie Zheng, Beijing (CN)

(73) Assignee: VMware LLC, Palo Alto, CA (US)

( * ) Notice: Subject to any disclaimer, the term of this patent is extended or adjusted under 35 U.S.C. 154(b) by 328 days.

(21) Appl. No.: 18/099,710

(22) Filed: Jan. 20, 2023

(65) Prior Publication Data

US 2024/0187378 A1    Jun. 6, 2024

(51) Int. Cl.
*H04L 9/40*    (2022.01)

(52) U.S. Cl.
CPC ................. *H04L 63/0263* (2013.01)

(58) Field of Classification Search
CPC ............... H04L 63/0263; H04L 63/20
See application file for complete search history.

(56) References Cited

U.S. PATENT DOCUMENTS

| | | | |
|---|---|---|---|
| 10,264,021 | B2 | 4/2019 | Bansal et al. |
| 10,454,824 | B2 | 10/2019 | Jiang et al. |
| 11,429,410 | B2 | 8/2022 | Bansal et al. |
| 2020/0218798 | A1* | 7/2020 | Kosaka ............ G06F 9/451 |
| 2021/0314190 | A1 | 10/2021 | Liu et al. |
| 2022/0035651 | A1 | 2/2022 | Maurya et al. |

OTHER PUBLICATIONS

Ivan Velichko, "How Container Networking Works: Practical Explanation", Web page, https://iximiuz.com/en/posts/container-networking-is-simple/, 31 pages, Oct. 18, 2020, retrieved on Jan. 20, 2023.
"Network Plugins", Web page, https://kubernetes.io/docs/concepts/extend-kubernetes/compute-storage-net/network-plugins/, 3 pages, Oct. 8, 2022, retrieved on Jan. 20, 2023.

* cited by examiner

*Primary Examiner* — Olugbenga O Idowu
(74) *Attorney, Agent, or Firm* — King Intellectual Asset Management

(57) ABSTRACT

The disclosure provides an example method for implementing a network policy in a software defined networking environment. The method generally includes receiving a manifest defining a plurality of pods, wherein: for a first pod, the manifest defines a first environment value, a first port number for a first container of the first pod, and a name for the first port number; for a second pod, the manifest defines the first environment value, a second port number for a second container of the second pod, and the name for the second port number; and the manifest defines a security policy applied to a third pod which defines a first egress policy indicating the first environment value and the name; and creating, based on the manifest indicating different port numbers, but the same name, for the different containers of the different pods, separate egress firewall rules for the first and second pods.

20 Claims, 10 Drawing Sheets

```
apiVersion: nsx.vmware.com/v1alpha1
kind: SecurityPolicy
metadata:
  - name: "named-port-policy"          ⎫
                                        ⎬ 206
spec:                                   ⎭
  appliedTo:                            ⎫
  - podSelector:                        ⎬ 208
      matchLabels:                      ⎪
        env: prod                       ⎭
  rules:                                ⎫
  - direction: in                       ⎪
    sources:                            ⎪
    - podSelector:                      ⎬ 210
        matchLabels:                    ⎪
          env: client                   ⎪
    ports:                              ⎪
    - protocol: TCP                     ⎪
      port: secured                     ⎭
  - direction: out                      ⎫
    destinations:                       ⎪
    - podSelector:                      ⎬ 212
        matchLabels:                    ⎪
          env: db                       ⎪
    ports:                              ⎪
    - protocol: TCP                     ⎪
      port: secured                     ⎭
```

FIG. 2B

| RULE: | SOURCE: | DESTINATION: | TCP PORT: |
|---|---|---|---|
| Ingress Rule 1 | Policy Group 1 – Pod 3 (IP: 192.168.0.12, Env: client) | Policy Group 2 – Pod 1 (IP: 192.168.0.10, Env: prod) Pod 5 (IP: 192.168.0.14, Env: prod) | Name: secured TCP Port 443 |
| Ingress Rule 2 | Policy Group 1 – Pod 3 (IP: 192.168.0.12, Env: client) | Policy Group 3 – Pod 2 (IP: 192.168.0.11, Env: prod) | Name: secured TCP Port 8443 |

FIG. 4C

| RULE: | SOURCE: | DESTINATION: | TCP PORT: |
|---|---|---|---|
| Egress Rule 1 | Policy Group 4 –<br>Pod 1 (IP: 192.168.0.10, Env: prod)<br>Pod 5 (IP: 192.168.0.14, Env: prod)<br>Pod 2 (IP: 192.168.0.11, Env: prod) | Policy Group 5 –<br>Pod 4 (IP: 192.168.0.13, Env: db) | Name: secured<br>TCP Port 8080 |
| Egress Rule 1 | Policy Group 4 –<br>Pod 1 (IP: 192.168.0.10, Env: prod)<br>Pod 5 (IP: 192.168.0.14, Env: prod)<br>Pod 2 (IP: 192.168.0.11, Env: prod) | Policy Group 6 –<br>Pod 6 (IP: 192.168.0.15, Env: db) | Name: secured<br>TCP Port 44 |

FIG. 5C

TECHNIQUES FOR APPLYING A NAMED PORT SECURITY POLICY

CROSS-REFERENCE TO RELATED APPLICATIONS

This application claims benefit of and priority to International Patent Application No. PCT/CN2022/135824, filed Dec. 1, 2022, entitled "TECHNIQUES FOR APPLYING A NAMED PORT SECURITY POLICY," and assigned to the assignee hereof, the contents of each of which are hereby incorporated by reference in its entirety.

BACKGROUND

Software defined networking (SDN) involves a plurality of hosts in communication over a physical network infrastructure of a data center (e.g., an on-premise data center or a cloud data center). The physical network to which the plurality of physical hosts are connected may be referred to as an underlay network. Each host has one or more virtualized endpoints such as virtual machines (VMs), containers, Docker containers, data compute nodes, isolated user space instances, namespace containers, and/or other virtual computing instances (VCIs), that are connected to, and may communicate over, logical overlay networks. For example, the VMs and/or containers running on the hosts may communicate with each other using an overlay network established by hosts using a tunneling protocol.

As part of an SDN, any arbitrary set of VMs in a datacenter may be placed in communication across a logical Layer 2 (L2) overlay network by connecting them to a logical switch. A logical switch is an abstraction of a physical switch that is collectively implemented by a set of virtual switches on each host that has a VM connected to the logical switch. The virtual switch on each host operates as a managed edge switch implemented in software by a hypervisor on each host. Virtual switches provide packet forwarding and networking capabilities to VMs running on the host. In particular, each virtual switch uses hardware based switching techniques to connect and transmit data between VMs on a same host, or different hosts.

Further, in some cases, multiple applications packaged into one or more groups of containers, referred to as pods, may be deployed on a single VM or a physical machine. The single VM or physical machine running a pod may be referred to as a node running the pod. In particular, a container is a package that relies on virtual isolation to deploy and run applications that access a shared operating system (OS) kernel. From a network standpoint, containers within a pod share a same network namespace, meaning they share the same internet protocol (IP) address or IP addresses associated with the pod.

A network plugin, such as a container networking interface (CNI) plugin, may be used to create virtual network interface(s) usable by the pods for communicating on respective logical networks of the SDN infrastructure. In particular, the CNI plugin is a runtime executable that configures a network interface, referred to as a CNI, into a container network namespace. The CNI plugin is further configured to assign a network address (e.g., an IP address) to each created network interface (e.g., for each pod) and may also add routes relevant for the interface. Pods can communicate with each other using their respective IP addresses. For example, packets sent from a source pod to a destination pod may include a source IP address of the source pod and a destination IP address of the destination pod, so that the packets are appropriately routed over a network from the source pod to the destination pod.

Traffic for a particular application, such as a particular container running the application, within a pod may be addressed using a Layer 4 destination port number associated with the application/container. For example, different containers within a pod may listen to specific destination port numbers, such that any particular container within a particular pod can be addressed using the IP address of the particular pod in conjunction with the port number (also referred to as a "port number," "port," or "container port") associated with the particular container. Accordingly, the packets may further include a source port number and a destination port number. The source port number may identify a particular source, such as a particular source container within the pod associated with the source IP address. Further, the destination port number may identify a particular destination, such as a particular destination container within the pod associated with the destination IP address. The port number may be considered a transport layer (e.g., Layer 4) address to differentiate between applications (e.g., containers running applications) or other service endpoints. The port number may refer to a transmission control protocol (TCP) or a user datagram protocol (UDP) port, or the like.

Communication between pods of a VM may be accomplished via use of a virtual switch implemented in the VM. The virtual switch may include one or more virtual ports (Vports) that provide logical connection points between pods. For example, a CNI of a first pod and a CNI of a second pod may connect to Vport(s) provided by the virtual switch to allow for communication between the first and second pods. In this context "connect to" refers to the capability of conveying network traffic, such as individual network packets, or packet descriptors, pointers, identifiers, etc., between components so as to effectuate a virtual datapath between software components.

It should be noted that there is no direct correlation between a virtual port (Vport) on a virtual switch and a physical port on a physical switch not related to TCP or UDP port numbers included in a packet header as discussed above. Physical switches include physical ports for connecting ethernet cables allowing the switch to direct packets from one port to another and thus from one device or endpoint to another. Vports are analogous to a physical ports, except that they are implemented in software to connect software elements and allow packets to be exchanged between them. Accordingly, each of a Vport and a physical port is different than a TCP or UDP port. A port number, as used herein unless explicitly stated otherwise herein, refers to a Layer 4 address (of the OSI model) used to differentiate between, for example, applications or other service endpoints, such as a TCP or UDP port number.

Further, a port may be referred to herein in the context of a "port of a pod" or a "port associated with an application running on the pod." Traffic sent or received from such a "port of a pod" or a "port associated with an application running on the pod" may refer to traffic with a source or destination IP address of the pod and a source or destination port number, respectively, of the port of the application associated with the traffic.

In some cases, to control traffic flow at the IP address and/or port level, one or more network policies may be defined for the pods. Network policies are used to control the traffic in (e.g., ingress) and/or out (e.g., egress) of pods. The network policies may indicate that certain traffic is allowed (e.g., whereby default traffic is not allowed, such as dropped or rejected), or that certain traffic is not allowed (e.g., whereby default traffic is allowed). It should be noted that ingress and/or egress may be defined to have the same default between allowed and not allowed traffic, or may have different defaults for a given pod. For example, by default, all inbound and outbound traffic for a pod may be allowed, and network policies may indicate that certain types of traffic are not allowed. In some cases, the network policies may indicate that certain types of traffic are not allowed by explicitly identifying the traffic which is not allowed. In some other cases, the network policies may indicate that certain types of traffic are not allowed by explicitly limiting traffic which is allowed. Accordingly, ingress and/or egress traffic for the pod may be restricted where a network policy limits such traffic for the pod. In another example, by default, all inbound and outbound traffic for a pod may be restricted, and network policies may indicate that certain types of traffic are allowed. In some cases, the network policies may indicate that certain types of traffic are allowed by explicitly identifying the traffic which is allowed. In some other cases, the network policies may indicate that certain types of traffic are allowed by explicitly limiting traffic which is restricted. As an illustrative example, when a pod is restricted for ingress with a default rule that traffic is not allowed, the only allowed traffic into the pod includes traffic from one or more endpoints explicitly identified as allowed by the ingress rules of the network policy. An endpoint may be a physical endpoint, such as a server, or a virtualized endpoint, such as a pod. In another example, when a pod is restricted for egress with a default rule that traffic is not allowed, the only allowed traffic from the pod includes traffic to other endpoints explicitly identified as allowed by the egress rules of the network policy.

When defining a network policy, in some cases, ports, such as associated with applications running in containers of pods, for which ingress traffic is allowed for the pods may be identified by their port name. The same may be true for egress traffic. A port name is a name given to (1) a port (e.g., a port number) associated with an application running within a single pod or (2) ports associated with applications running within different pods under a same namespace. Configuration files made up of one or more manifests that declare intended system infrastructure (e.g., pods, containers, etc.) and applications to be deployed in the system may specify the port name for each of the different ports, where applicable.

For example, a configuration file may be used to create a web deployment pod corresponding to a first pod and a database deployment pod corresponding to a second pod in a same namespace. A first port number defined in the configuration file for the web deployment pod may be "8080," and a port name for port number "8080" defined for the web deployment pod may be "server." A second port number defined in the configuration file for the database deployment pod may also be "8080," and the port name for port number "8080" defined for the database deployment pod may also be "server." In an example case where a user defines a security policy that indicates that traffic to ports named "server" may be allowed based on egress rules of the policy, application of the network policy may allow traffic with a destination port number "8080" from a source of the traffic (e.g., a source pod). Such application of the network policy correctly allows traffic with a destination port number "8080" to both the web deployment pod and the database deployment pod, meaning traffic with a destination IP address of either the web deployment pod and the database deployment pod and the destination port number "8080."

In some cases, however, application of a network policy, which uses named ports when defining ingress and/or egress rules for the policy, may result in allowing traffic to/from one or more pods that were intended to be restricted, or disallowing traffic to/from one or more pods that were intended to be allowed, thereby adversely affecting overall integrity and security of the system. For example, assume a configuration file defines a first port number for the web deployment pod as "8080," with a port name "server." Further, assume the configuration file defines a second port number for the database deployment pod as "8080," with a port name "foo," or not even defines a second port number for the database deployment pod assigned the port number "8080." In the example case, where a user defines a security policy that indicates that all traffic to ports named "server" may be allowed based on egress rules of the policy, application of the network policy may allow traffic with a destination port number "8080," including traffic with a destination port number "8080" and a destination IP address of the database deployment pod. However, port number "8080" is not associated with the port name "server" for the database deployment pod and therefore should not be allowed.

SUMMARY

One or more embodiments provide a method for implementing a network policy in a software defined networking (SDN) environment. The method generally includes receiving a manifest defining a plurality of pods in a namespace. For a first pod, the manifest defines a first environment value for an environment of the first pod, a first port number for a first container of the first pod, and a name for the first port number defined for the first container of the first pod. For a second pod, the manifest defines the first environment value for an environment of the second pod, a second port number for a second port associated with a second container of the second pod, and the name for the second port number defined for the second container of the second pod. Further, the manifest defines a security policy applied to a third pod. The security policy defines a first egress policy indicating the first environment value and the name. Based on the manifest indicating that the first port number is different than the second port number and that the first port number and the second port number share the name, the method further comprises creating separate egress firewall rules for the first pod and the second pod. The separate egress firewall rules include a first egress firewall rule to apply to packets with the third pod as a source, the first pod as a destination, and the first port number as a destination port. The separate egress firewall rules also include a second egress firewall rule to apply to packets with the third pod as a source, the second pod as a destination, and the second port number as a destination port. The method further includes configuring a firewall with the first egress firewall rule and the second egress firewall rule.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

FIGS. 2A and 2B illustrate an example manifest defining a network policy for a particular namespace having multiple pods, according to an example embodiment of the present disclosure.

FIGS. 4B and 4C illustrate example ingress rules defined for the example pods illustrated in FIG. 3, according to an example embodiment of the present disclosure.

FIGS. 5B and 5C illustrate example egress rules defined for the example pods illustrated in FIG. 3, according to an example embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
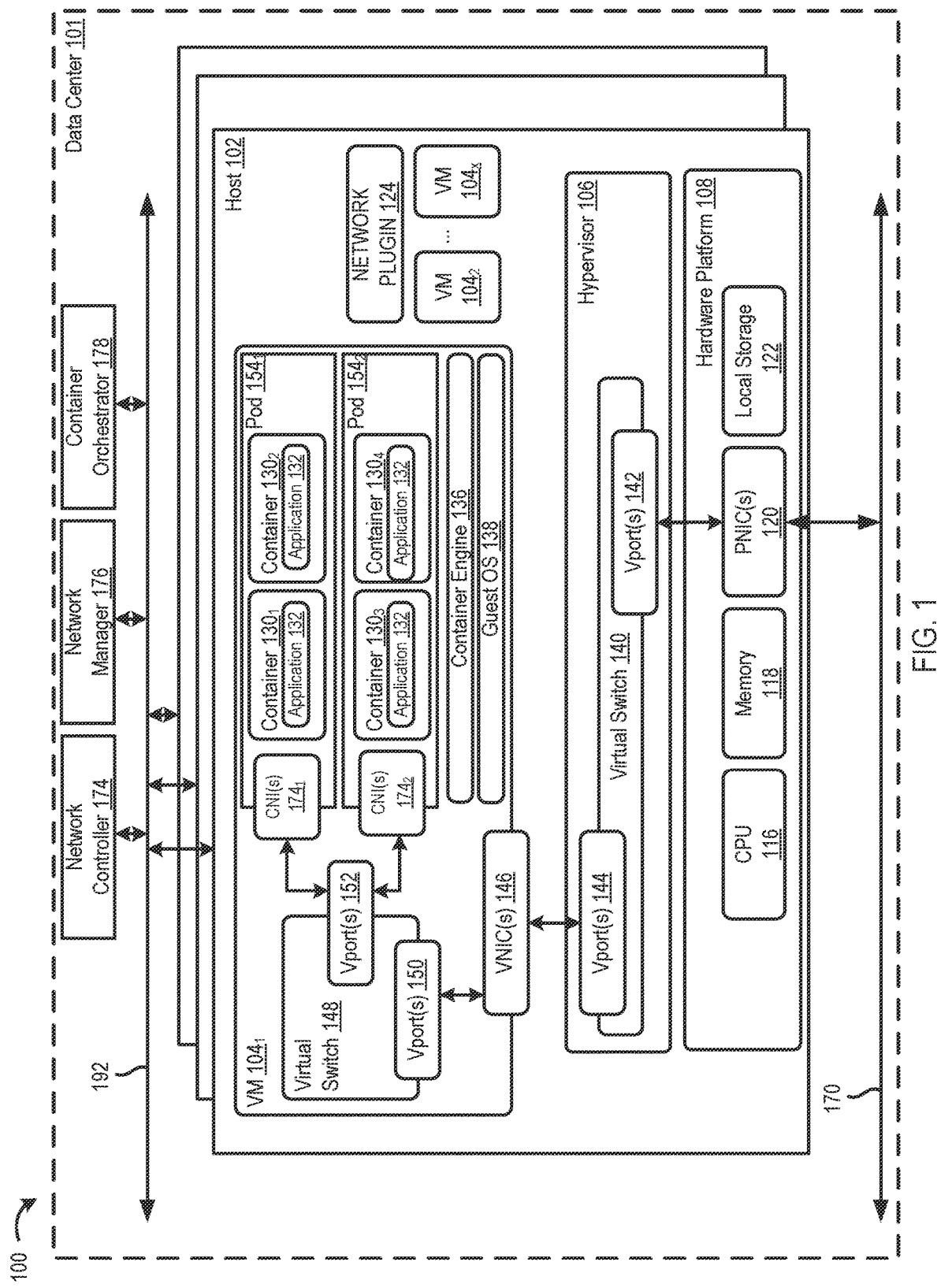
FIG. 1 illustrates a computing system in which embodiments described herein may be implemented.

Improved techniques for the application of a network policy that uses named ports when defining ingress and/or egress rules for the policy are described herein. Although described herein with respect to a network policy, the techniques may be similarly applied for the application of other policies, including other security policies that use named ports. The port name may not be a unique name; thus, the same port name may be given to ports (e.g., port numbers) associated with applications running within different pods, irrespective of which deployment and/or namespace the pods belong to. For example, the port name "server" may be given to TCP port 8080 associated with a first application on a first pod and to TCP port 8181 associated with a second application on a second pod.

In certain aspects, a manifest may be created and used to configure network access policies for the pods. As described above, the network policy may (1) identify one or more pods where the policy is applied (referred to as the "applied-to pods"), (2) identify the type of traffic the network policy affects (e.g., ingress and/or egress traffic), (3) the action to apply (e.g., allow, drop (i.e., drop without informing the sender), or reject (i.e., drop and inform the sender the packet was dropped) packets), (4) for ingress policies, identify the pods that are sources of traffic for which the action applies, and (5) for egress, identify the pods that are destinations of traffic for which the action applies. The ingress and/or egress rules defined in the network policy may refer to particular port names to which the policy is applied. As discussed, the port names may be assigned to particular port numbers associated with applications running on pods and ingress and/or egress traffic. Thus, the ingress and/or egress rules may be applied to traffic to/from such ports associated with applications. Where a network policy identifies port numbers by their assigned port name, in addition to recognizing which port numbers have a port name matching the port name identified in the policy, techniques described herein further consider the port number when determining rules for ingress and/or egress. Certain examples herein may be discussed with respect to policies where the action to apply is "allow", however the techniques described herein also apply to policies with actions of different types, such as drop or reject.

For example, a network policy may identify destination ports for ingress traffic and/or destination ports for egress traffic to which to apply the policy by referring to a particular port name. A destination port to which to apply the policy may refer to a port associated with a destination application on a destination pod to which the traffic is directed. Accordingly, the policy may be applied to traffic with a destination IP address corresponding to the destination pod and a destination port number corresponding to the destination application. Where applications/containers of multiple pods are associated with destination port numbers with port names matching the particular port name, and at least one of the port numbers is different than the other port numbers, then multiple ingress or egress rules may be created. Each rule created may include ports of applications running in pods having a same port name and a same or different port number. Further, each of the sources and destinations defined for each rule created may be precisely limited to an internet protocol (IP) set group which contains a restricted list of IP addresses corresponding to different pods.

As a first illustrative example, a network policy may identify destination ports for egress traffic as ports having a name "secured." Applications of two different pods may each be assigned a port named "secured." While one of the ports (e.g., the first port of the first pod) may correspond to a port number "8080," the other port (e.g., the second port of the second pod) may correspond to a port number "8181." As such, two rules for egress may be created: a first rule including port number "8080" as the destination port for egress traffic and a second rule including port number "8181" as the destination port for egress traffic. Further, the first rule may identify a first IP set group including the IP address of the first pod as the destination for the egress rule, while the second rule may identify a second IP set group including the IP address of the second pod as the destination for the egress rule.

As a second illustrative example, instead of applications of only two pods having a port assigned a port name "secured," an application running in a third pod may also exist having a port named "secured." The port of the third pod (e.g., the third port) may be "8181." In this example, two rules for egress may also be created. Since two pods share a port number 8181, the second rule may concern traffic directed to both pods. In particular, the first rule applies to egress traffic having a destination port number "8080" while the second rule applies to egress traffic having a destination port number "8181." Further, the first rule may identify a first IP set group including the IP address of the first pod as the destination for the egress rule, while the second rule may identify a second IP set group including the IP address of the second pod and the IP address of the third pod as the destinations for the egress rule.

In other words, a single rule specifying a particular port number can be applied on traffic that includes that port number even though it is going to different pods. Additionally, separate ingress or egress rules may be created (e.g., based on the defined network policy) for different destination port numbers having a same port name.

Existing rules created based on application of the network policy may be constantly updated. For example, when a new pod is created, where the new pod includes an application associated with a port assigned a port name matching a port name defined in the policy, the rules may be updated to account for the new pod/port such that the rules consider all pods/ports which are identified (e.g., via port name) by the network access policies. Additionally, when an existing port name associated with a port number or an existing port number associated with a port name changes, when pods and/or ports names are removed or added, and/or when labels of resources, such as pods and/or namespaces, are changed, ingress and/or egress rules created based on the network policy may be updated.

As such, the techniques described herein better support the application of a network policy that uses named ports when defining ingress and/or egress rules for the policy. Such techniques help to ensure that network access intended by a user is, in fact, carried out. In other words, traffic which is intended to be restricted for applications of one or more pods is restricted when the network policy is applied. The opposite is true for traffic which is to be allowed. This helps to ensure the security and integrity of the overall system. Additionally, the techniques described herein support a flexible distributed firewall rule definition that is able to handle constantly changing external conditions.

FIG. 1 depicts example physical and virtual network components in a networking environment 100 in which embodiments of the present disclosure may be implemented.

Networking environment 100 includes a data center 101. Data center 101 includes one or more hosts 102, a management network 192, a data network 170, a network controller 174, a network manager 176, and a container orchestrator 178. Data network 170 and management network 192 may be implemented as separate physical networks or as separate virtual local area networks (VLANs) on the same physical network.

Host(s) 102 may be communicatively connected to data network 170 and management network 192. Data network 170 and management network 192 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be configured to provide a virtualization layer, also referred to as a hypervisor 106, that abstracts processor, memory, storage, and networking resources of a hardware platform 140 into multiple VMs $104_1$-$104_x$ (collectively referred to herein as "VMs 104" and individually referred to herein as "VM 104").

Host(s) 102 may be constructed on a server grade hardware platform 108, such as an x86 architecture platform. Hardware platform 108 of a host 102 may include components of a computing device such as one or more processors (CPUs) 116, system memory 118, one or more network interfaces (e.g., physical network interface cards (PNICs) 120), storage 122, and other components (not shown). A CPU 116 is configured to execute instructions, for example, executable instructions that perform one or more operations described herein and that may be stored in the memory and storage system. The network interface(s) enable host 102 to communicate with other devices via a physical network, such as management network 192 and data network 170.

Hypervisor 106 includes a virtual switch 140. A virtual switch 140 may be a virtual switch attached to a default port group defined by network manager 176 and provide network connectivity to a host 102 and VMs 104 on the host. Port groups include subsets of Vports of a virtual switch, each port group having a set of logical rules according to a policy configured for the port group. Each port group may comprise a set of Vports associated with one or more virtual switches on one or more hosts. Vports associated with a port group may be attached to a common VLAN according to the IEEE 802.1Q specification to isolate the broadcast domain.

A virtual switch 140 may be a virtual distributed switch (VDS). In this case, each host 102 may implement a separate virtual switch corresponding to the VDS, but the virtual switches 140 at each host 102 may be managed like a single virtual distributed switch (not shown) across the hosts 102.

Each of VMs 104 running on host 102 may include virtual interfaces, often referred to as virtual network interface cards (VNICs), such as VNICs 146, which are responsible for exchanging packets between VMs 104 and hypervisor 106. VNICs 146 can connect to Vports 144, provided by virtual switch 140. Virtual switch 140 also has Vport(s) 142 connected to PNIC(s) 120, such as to allow VMs 104 to communicate with virtual or physical computing devices outside of host 102 via data network 170 and/or management network 192.

Each VM 104 may also implement a virtual switch 148 for forwarding ingress packets to various entities running within the VM 104. For example, the various entities running in within each VM 104 may include pods 154 including containers 130.

In particular, each VM 104 implements a virtual hardware platform that supports the installation of a guest OS 138 which is capable of executing one or more applications. Guest OS 138 may be a standard, commodity operating system. Examples of a guest OS include Microsoft Windows, Linux, and/or the like.

Each VM 104 may include a container engine 136 installed therein and running as a guest application under control of guest OS 138. Container engine 136 is a process that enables the deployment and management of virtual instances (referred to interchangeably herein as "containers") by providing a layer of OS-level virtualization on guest OS 138 within VM 104. Containers 130 are software instances that enable virtualization at the OS level. That is, with containerization, the kernel of guest OS 138, or an OS of host 102 if the containers are directly deployed on the OS of host 102, is configured to provide multiple isolated user space instances, referred to as containers. Containers 130 appear as unique servers from the standpoint of an end user that communicates with each of containers 130. However, from the standpoint of the OS on which the containers execute, the containers are user processes that are scheduled and dispatched by the OS.

Containers 130 encapsulate an application, such as application 132 as a single executable package of software that bundles application code together with all of the related configuration files, libraries, and dependencies required for it to run. Application 132 may be any software program, such as a word processing program or a gaming server.

A user can deploy containers 130 through container orchestrator 178. Container orchestrator 178 implements an orchestration control plane, such as Kubernetes®, to deploy and manage applications and/or services thereof on hosts 102, of a host cluster, using containers 130. For example, Kubernetes may deploy containerized applications as containers 130 and a control plane (not shown) on a cluster of hosts. The control plane, for each cluster of hosts, manages the computation, storage, and memory resources to run containers 130. Further, the control plane may support the deployment and management of applications (or services)

on the cluster using containers 130. In some cases, the control plane deploys applications as pods 154 of containers 130 running on hosts 102, either within VMs or directly on an OS of the host. Other type of container-based clusters based on container technology, such as Docker® clusters, may also be considered.

In order for packets to be forwarded to and received by pods 154 and their containers 130 running in a first VM $104_1$, each of the pods 154 may be set-up with a network interface, such as a CNI 174. The CNI 174 is associated with an IP address, such that the pod 154, and each container 130 within the pod 154, is addressable by the IP address. Accordingly, after each pod 154 is created, a network plugin 124 is configured to set up networking for the newly created pod 154 enabling the new containers 130 of the pod 154 to send and receive traffic.

Further, network plugin 124 may also configure virtual switch 148 running in VM(s) 104 (e.g., where the created pods 154 are running) to forward traffic destined for the new pods 154. This allows virtual switch 148 to forward traffic for the new pods 154. Accordingly, for example, after receiving the traffic from VNIC 146 directed for a pod $154_1$, virtual switch 148 processes the packets and forwards them (e.g., based on the container's IP address in the packets' header) to a pod $154_1$ by pushing the packets out from Vport 152 on virtual switch 148 connected to CNI $174_1$ that is configured for and attached to a pod $154_1$. As shown, other CNIs, such as CNI $174_2$, may be configured for and attached to different, existing a pods 154.

As described in more detail below, ingress and/or egress traffic to one or more applications, such as containers 130, running in pods 154 may be allowed or restricted based on information contained in manifest file(s), defining network access policies, created for the pods 154. In certain aspects, filtering of traffic for a container 130 based on information included in such a manifest occurs at virtual switch 148 within VM 104. In certain other aspects, filtering of the traffic for a container 130 occurs at VNIC 146 of VM 104. In certain other aspects, filtering of the traffic for a container 130 occurs at virtual switch 140 in hypervisor 106. In certain other aspects, filtering of the traffic for a container 130 occurs at a CNI 174 of a pod 154 in which the container 130 runs.

Data center 101 includes a network management plane and a network control plane. The management plane and control plane each may be implemented as single entities (e.g., applications running on a physical or virtual compute instance), or as distributed or clustered applications or components. In alternative aspects, a combined manager/controller application, server cluster, or distributed application, may implement both management and control functions. In the embodiment shown, network manager 176 at least in part implements the network management plane and network controller 174 at least in part implements the network control plane.

The network control plane is a component of software defined network (SDN) infrastructure and determines the logical overlay network topology and maintains information about network entities such as logical switches, logical routers, endpoints, etc. The logical topology information is translated by the control plane into physical network configuration data that is then communicated to network elements of host(s) 102. Network controller 174 generally represents a network control plane that implements software defined networks, e.g., logical overlay networks, within data center 101. Network controller 174 may be one of multiple network controllers executing on various hosts in the data center that together implement the functions of the network control plane in a distributed manner. Network controller 174 may be a computer program that resides and executes in a server in the data center 101, external to data center 101 (e.g., such as in a public cloud) or, alternatively, network controller 104 may run as a virtual appliance (e.g., a VM) in one of hosts 102. Network controller 174 collects and distributes information about the network from and to endpoints in the network. Network controller 174 may communicate with hosts 102 via management network 192, such as through control plane protocols. In certain aspects, network controller 174 implements a central control plane (CCP) which interacts and cooperates with local control plane components, e.g., agents, running on hosts 102 in conjunction with hypervisors 106.

Network manager 176 is a computer program that executes in a server in networking environment 100, or alternatively, network manager 176 may run in a VM 104, e.g., in one of hosts 102. Network manager 174 communicates with host(s) 102 via management network 192. Network manager 176 may receive network configuration input from a user, such as an administrator, or an automated orchestration platform (not shown) and generate desired state data that specifies logical overlay network configurations. For example, a logical network configuration may define connections between VCIs and logical ports of logical switches. Network manager 176 is configured to receive inputs from an administrator or other entity, e.g., via a web interface or application programming interface (API), and carry out administrative tasks for data center 101, including centralized network management and providing an aggregated system view for a user.

Figure 2A:
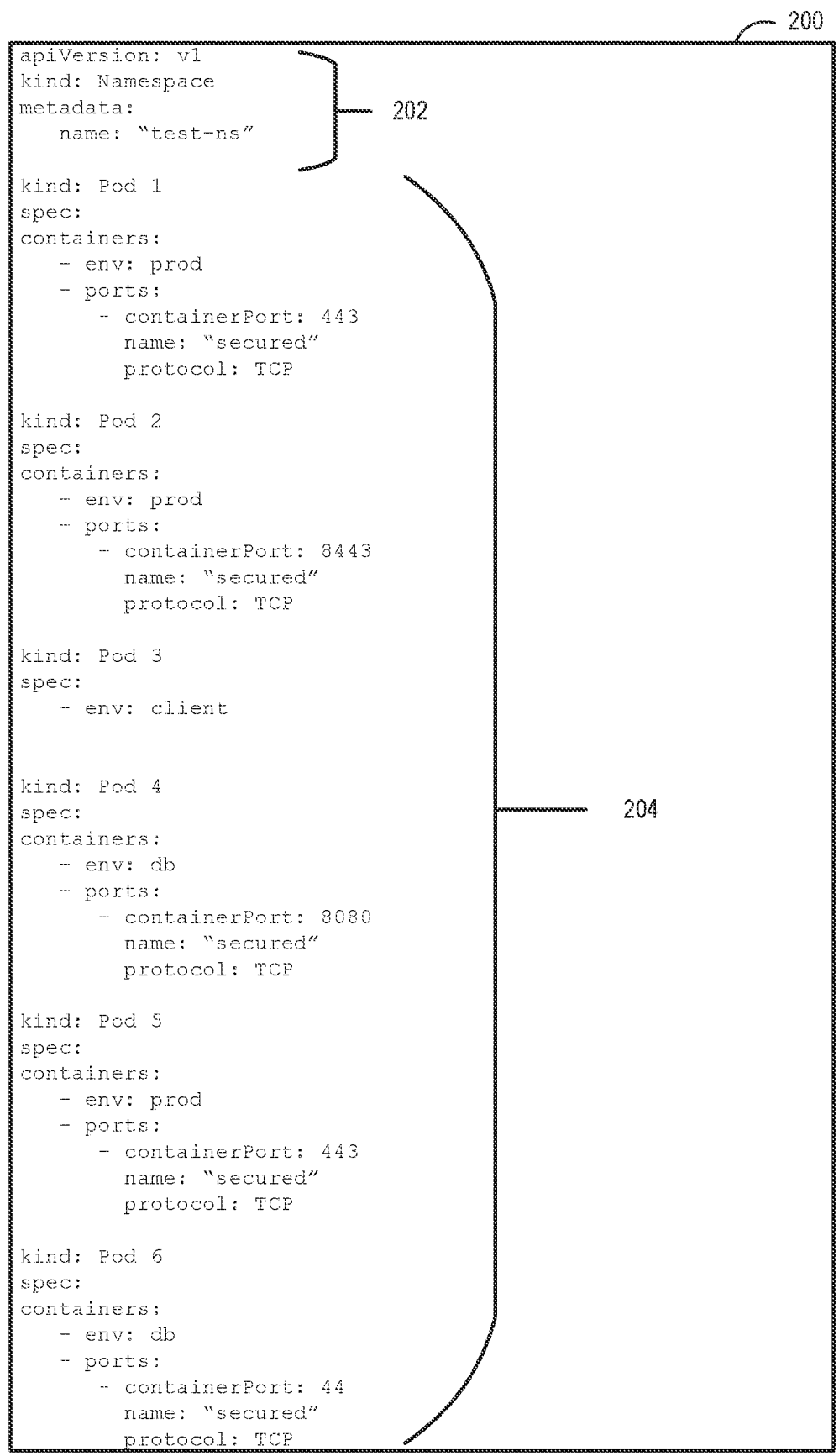

FIGS. 2A and 2B illustrate an example manifest 200 defining a network policy for a particular namespace having multiple pods, according to an example embodiment of the present disclosure. As described above, manifests may not only be used to declare intended system infrastructure (e.g., pods, containers, etc.) and applications to be deployed in the system, but may also be used to control traffic flow in and/or out of created pods and containers.

As illustrated in FIG. 2A, example manifest 200 is used to create a namespace named "test-ns," as shown at 202. Further, based on manifest 200, six pods are created to exist within the namespace (e.g., shown at 204 in FIG. 2A). A first pod (e.g., pod 1) may have a first container $130_1$ associated with a port number 443 and port name "secured." A second pod (e.g., pod 2) may have a second container $130_2$ associated with a port number 8443 and also port name "secured." A third pod (e.g., pod 3) may not have any containers associated with ports. A fourth pod (e.g., pod 4) may have a fourth container associated with a port number 8080 and also port name "secured." A fifth pod (e.g., pod 5) may have a fifth container associated with a port number 443 and also port name "secured." A sixth pod (e.g., pod 6) may have a sixth container associated with a port number 44 and also port name "secured." As such, all ports defined in manifest 200 may be assigned a same name (e.g., port name "secured").

Further, manifest 200 may define an environment for pods 1, 2, and 5 as a production environment (e.g., env: prod). Manifest 200 may define an environment for pods 4 and 6 as a database environment (e.g., env: db). Additionally, manifest 200 may define an environment for pod 3 as a client environment (e.g., env: client).

Figure 3:
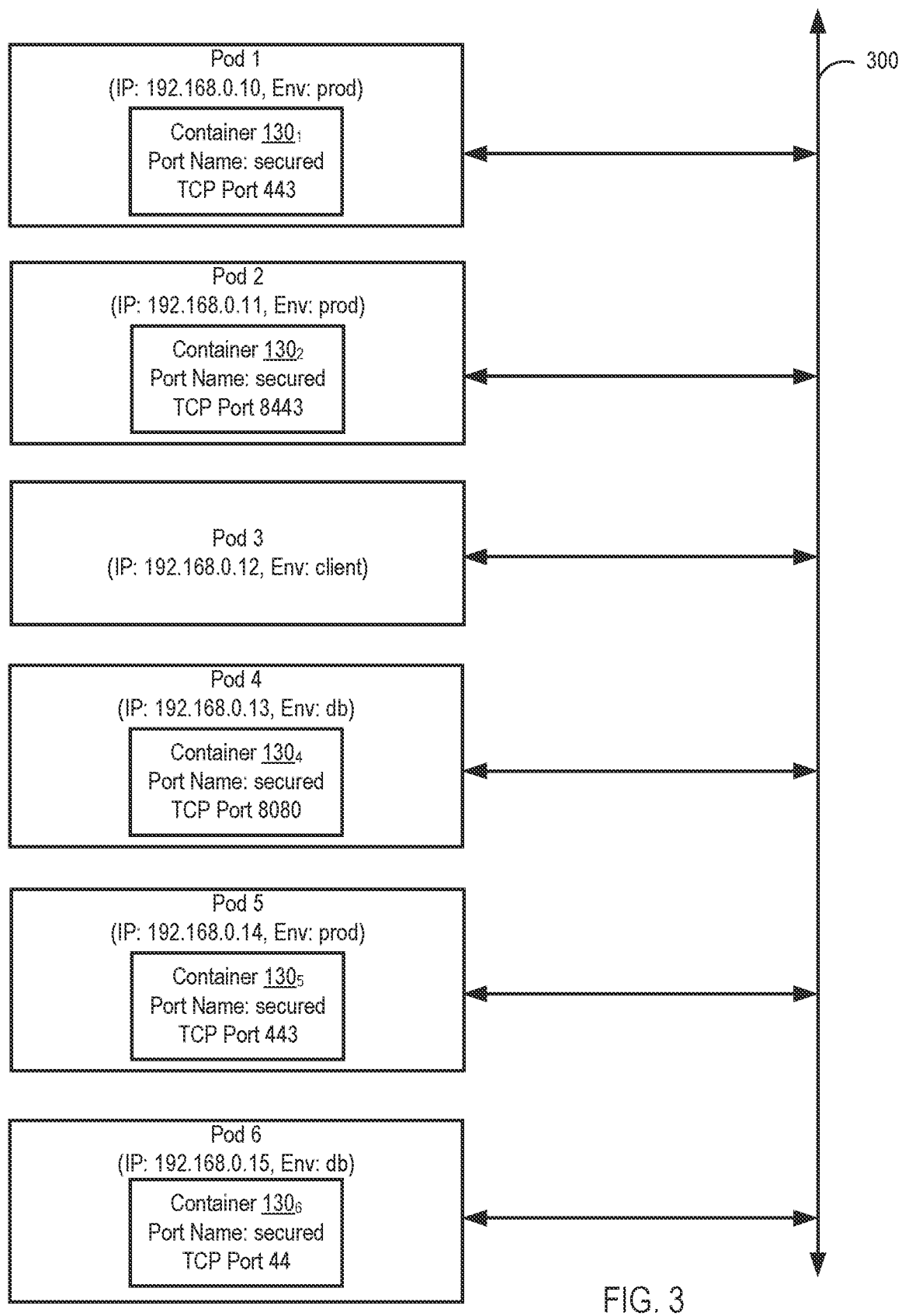
FIG. 3 illustrates example pods defined by the manifest illustrated in FIGS. 2A and 2B, according to an example embodiment of the present disclosure.

Pods 1-6 and their corresponding containers and associated ports defined by manifest 200 are illustrated in FIG. 3. As illustrated, pods 1-6 may be in communication with each other over a network 300. For example, pods 1-6 may communicate with each other using their respective IP addresses. Accordingly, pods 1-6 may exchange packets over network 300. As described above with respect to FIG. 1, such communication may occur via use of virtual switch 148 in VM 104 where one or more of pods 1-6 are deployed, other virtual switches in VMs where one or more of pods 1-6 are deployed, and/or other virtual switches connected to VMs where one or more of pods 1-6 are deployed. In some cases, this communication may be restricted based on ingress and/or egress rules defined for pods 1-6. For example, communication between pods 1-6 (and more specifically, container running within each of these pods) may be restricted according to a network policy defined and contained in example manifest 200, as illustrated in FIG. 2B.

Example manifest 200 is used to further create a network policy named "named-port-policy," as shown at 206 in FIG. 2B. The network policy specifies for a particular set of pods, having containerized applications running therein, ingress and/or egress rules which are to be enforced for the set. In particular, the network policy includes an "appliedTo" field with a "podSelector" subfield which selects a group of pods to which the policy applies (e.g., shown at code block 208 in FIG. 2B). The example policy illustrated selects pods with the label "env: prod." These pods may be referred to herein as the "applied to pods." Additional details of using an "appliedTo" field are described in U.S. Pat. No. 10,264,021, filed on Dec. 14, 2015, and titled "Method and Apparatus for Distributing Firewall Rules," which is hereby incorporated by reference herein in its entirety.

For the applied to pods, the network policy defines both ingress rules, denoted in code block 210 by field "rules" and sub-field "direction: in" and egress rules, denoted in code block 212 by field "rules" and sub-field "direction: out." In other words, the network policy identifies what pod/port traffic (e.g., packets) to take the specified action for ingress into the applied to pods. Further, the network policy identifies what pod/port traffic (e.g., packets) to take the specified action for egress from the applied to pods. Although example manifest 200 illustrates both ingress rules and egress rules defined in the network policy, in certain other embodiments, only ingress rules or only egress rules may be defined. The ingress rules and egress rules in example manifest 200 are rules with the action allow, however, it should be noted that this is merely an example, and the techniques may be applied to rules with other types of actions.

The network policy illustrated contains a single rule for ingress (e.g., shown at code block 210 in FIG. 2B). In particular, the network policy includes a "rules" field with a "podSelector" subfield for "direction: in" traffic which selects a group of pods for which ingress is allowed. The example policy illustrated selects pods with the label "env: client."

Additionally, the network policy contains two rules for egress (e.g., shown at code block 212 in FIG. 2B). In particular, the network policy includes a "rules" field with (1) a subfield for "direction: out" traffic which selects a group of pods for which egress is allowed and (2) a "ports" field which further limits the group of pods, selected via the "podSelector" label, to pods that have containers associated with a matching port name identified in the network policy. The example policy illustrated selects pods with the label "env: db" and having a container associated with a port with a port name "secured."

Figure 4A:
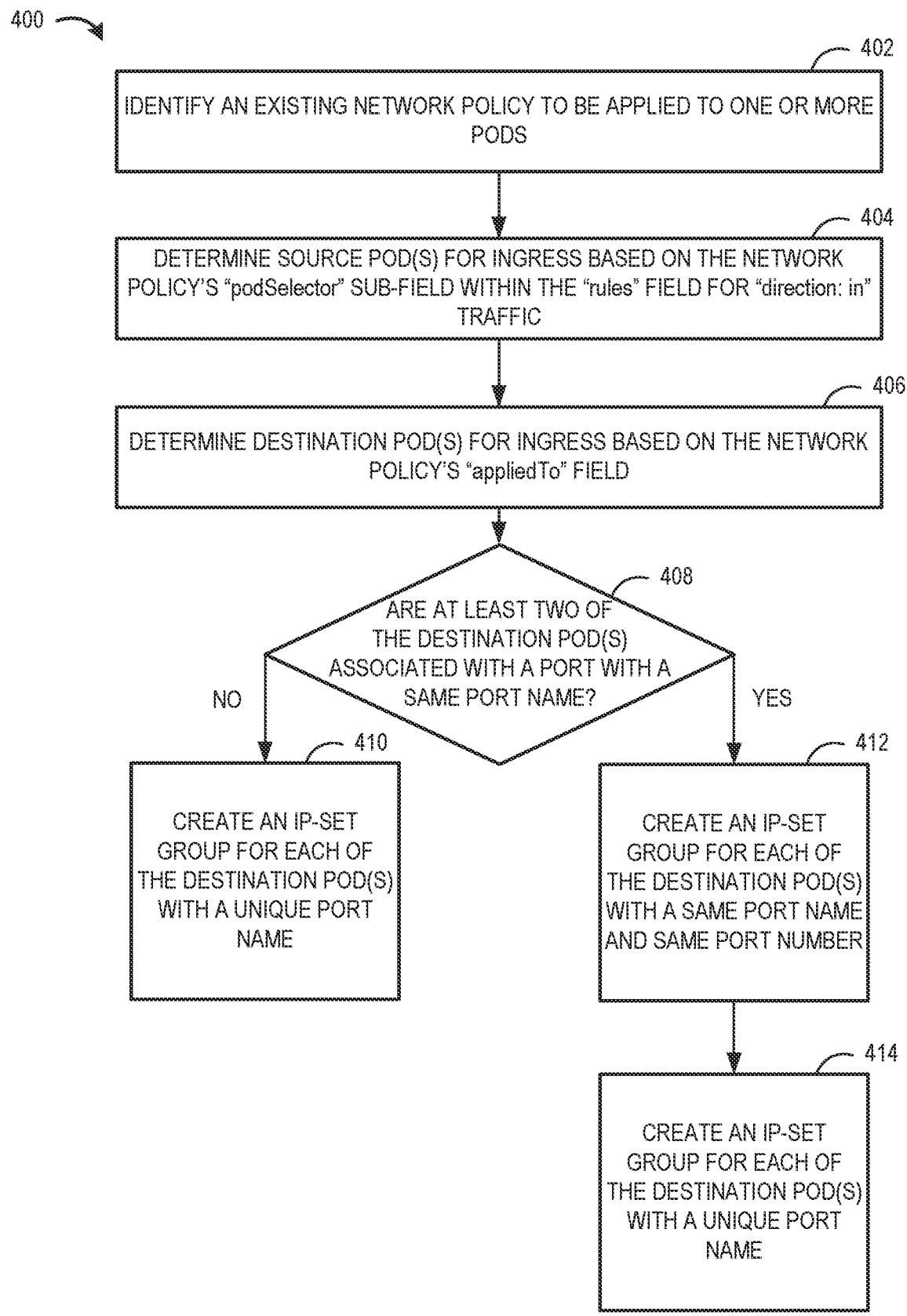
FIG. 4A illustrates an example workflow for determining ingress rules defined in an example network policy, according to an example embodiment of the present disclosure.
Figure 4B:
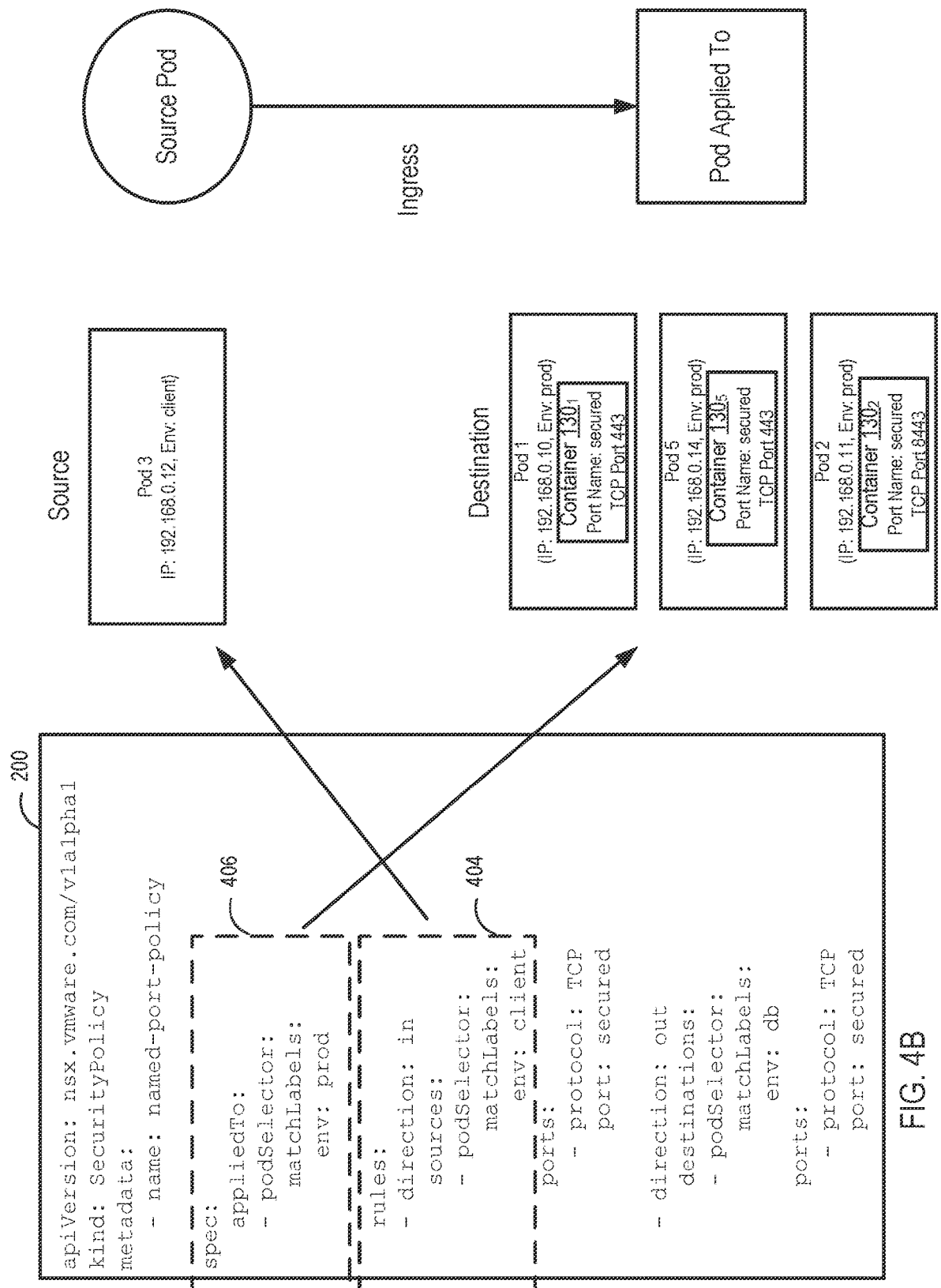
Figure 5A:
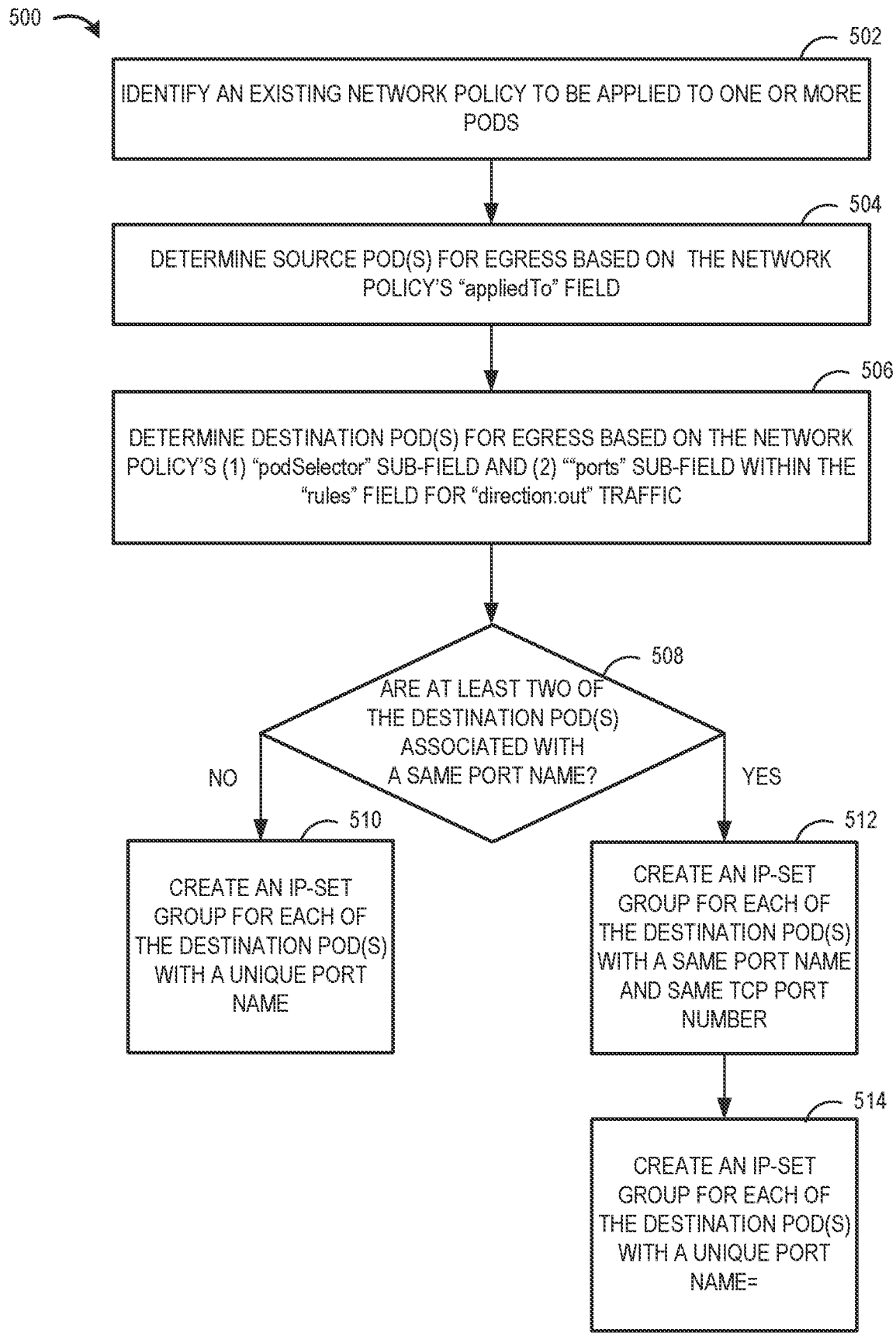
FIG. 5A illustrates an example workflow for determining egress rules defined in an example network policy, according to an example embodiment of the present disclosure.
Figure 5B:
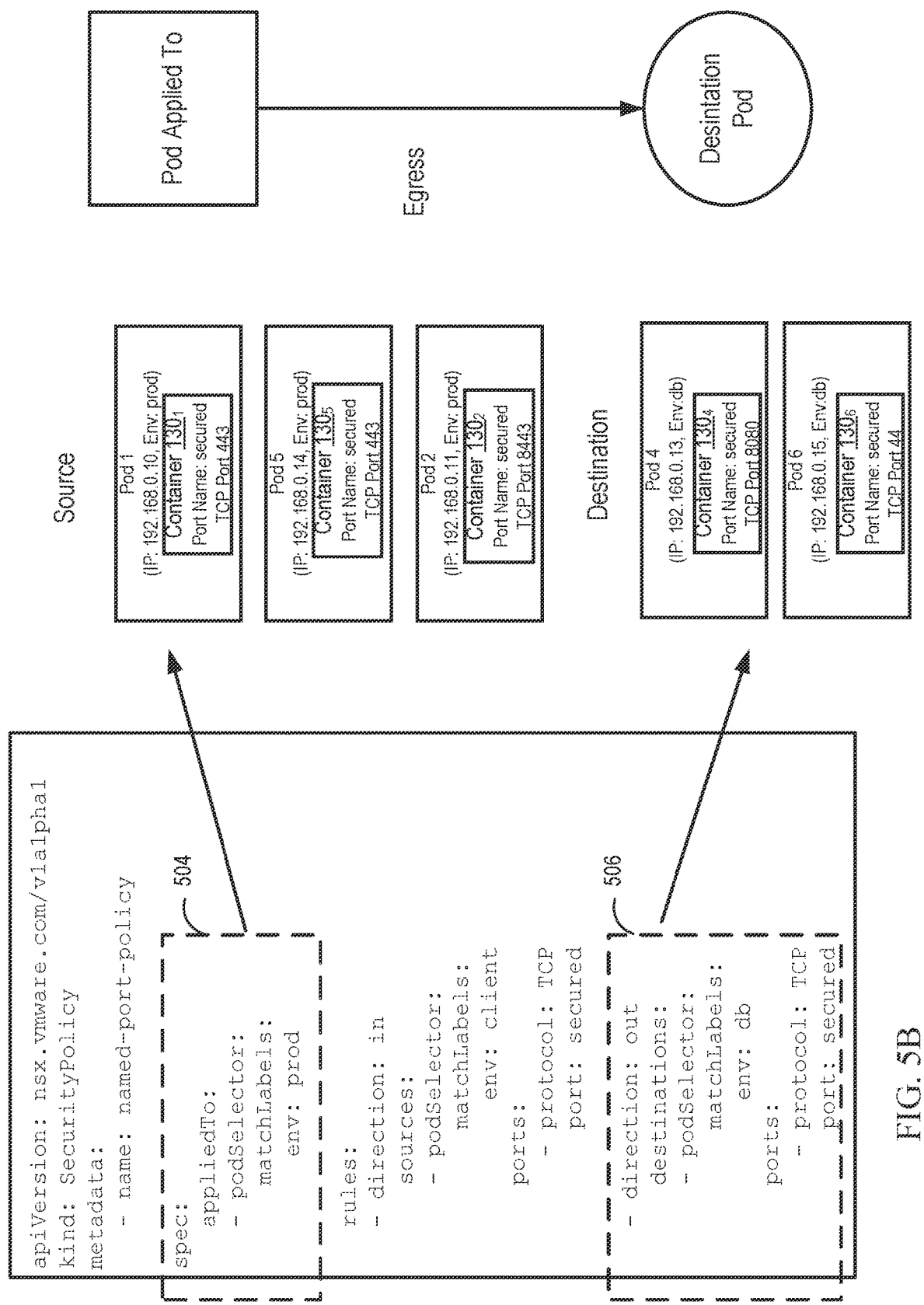

Application of the network policy, defined in example manifest 200, to pods 1-6 (e.g., illustrated in FIG. 3 and created via configuration information in example manifest 200 illustrated in FIG. 2A) is illustrated in FIGS. 4A-4C and 5A-5C. For example, FIG. 4A illustrates an example workflow 400 for determining ingress rules, based on the network policy illustrated in FIG. 2B, to be applied to traffic of one or more pods of FIG. 3. For ease of explanation, workflow 400 is described with respect to the example illustrated in FIGS. 4B and 4C. Additionally, FIG. 5A illustrates an example workflow 500 for determining egress rules, based on the network policy illustrated in FIG. 2B, to be applied to traffic of one or more pods of FIG. 3. For ease of explanation, workflow 500 is described with respect to the example illustrated in FIGS. 5B and 5C.

As illustrated in FIG. 4A, workflow 400 beings at block 402, by identifying an existing network policy that is to be applied to traffic of one or more created pods. The network policy identified at block 402 may be network policy "named-port-policy" illustrated in FIG. 2B.

At block 404, workflow 400 continues by determining source pod(s) for ingress traffic based on the network policy's "podSelector" sub-field within the "rules" field for "direction: in" traffic. For example, as illustrated at 404 in FIG. 4B, source pods for ingress traffic identified by the network policy are pods with the label "env: client." Per manifest 200, only pod 3 has an environment defined as a client environment (e.g., env: client). As such, pod 3 is the only source pod identified by the network policy. This means that traffic from pod 3 is the only traffic that is permitted into the applied to pod(s) identified by the network policy.

The applied to pod(s) (e.g., the destination pod(s) for ingress rules) are identified at block 406. In particular, at block 406, workflow 400 continues by determining the destination pod(s) for ingress traffic based on the network policy's "appliedTo" field. For example, as illustrated at 406 in FIG. 4B, destination pods for ingress traffic identified by the network policy are pods with the label "env: prod." Per manifest 200, pods 1, 2, and 5 have an environment defined as a production environment (e.g., env: prod). As such, pods 1, 2, and 5 are the only destination pods identified by the network policy. This means that traffic from pod 3 is the only traffic that is permitted into pods 1, 2, and 5, where that traffic has a destination port number assigned a port name "secured," per the policy, as further discussed.

At block 408, workflow 400 continues by determining whether at least two of the destination pods have a container associated with a port with a same port name. As described above, destination pods having containers associated with a same port number, having a same port name, may be combined into a single rule for ingress. Additionally, separate ingress rules may be created for destination pods having containers associated with different port numbers, but having a same port name. In this example, the first port of the first container of pod 1, the second port of the second container of pod 2, and the fifth port of the fifth container of pod 5 all share a same port name "secured." Accordingly, at block 408, it is determined that at least two of the destination pods have containers associated with ports with a same name.

Accordingly, at block 412, workflow 400 continues by creating an IP-set group for each of the destination pods having containers associated with a same port name and a same port number. Further, at block 414, workflow 400 continues by creating an IP-set group for each of the destination pods having containers associated with a unique port name. For example, although the first port, the second port, and the fifth port all share a common port name, the ports are not the same (e.g., the port numbers are different).

In particular, only the first port number and the fifth port number are port number "443." The second port number is port number "8443." As such, at blocks 412 and 414, two IP-set groups are created. A first IP-set group (e.g., shown as policy group 2 in FIG. 4C) may include the first port and the fifth port (e.g., port number "443" with port name "secured"), while a second IP-set group (e.g., shown as policy group 3 in FIG. 4C) may include only the second port (e.g., port number "8443" with port name "secured").

Accordingly, as shown in FIG. 4C, when the network policy is applied, two ingress rules may be created. The first ingress rule may permit ingress traffic from policy group 1 to policy group 2 on TCP port 443, where policy group 1 includes pod 3 (e.g., the source pod) and policy group 2 includes pods 1 and 5 (e.g., two of the destination pods). In particular, the first ingress rule allows traffic having a source IP address of pod 3 (e.g., 192.168.0.12), a destination IP address of pods 1 or 5 (e.g., 192.168.0.10 or 192.168.0.14), and a destination port number 443 (e.g., and any source port number). The second ingress rule may permit ingress traffic from policy group 1 to policy group 3 on TCP port 8443, where policy group 1 includes pod 3 (e.g., the source pod) and policy group 3 includes pod 2 (e.g., one of the destination pods). In particular, the second ingress rule allows traffic having a source IP address of pod 3 (e.g., 192.168.0.12), a destination IP address of pod 2 (e.g., 192.168.0.11), and a destination port number 8443 (e.g., and any source port number).

Although not illustrated by the provided example, in some cases at block 406 in FIG. 4A, only one destination pod is determined for ingress traffic or multiple destination pods are determined for ingress traffic, but none of the pods have containers associated with ports which share a same port name. As such, at block 408, workflow 400 determines that at least two of the destination pods are not associated with a same port name and instead proceeds to block 410, where an IP-set group for each of the destination pod(s) associated with a unique port name is created.

Similar logic used in workflow 400 for determining ingress rules may be used in workflow 500 of FIG. 5A for determining egress rules.

As illustrated in FIG. 5A, similar to workflow 400, workflow 500 begins at block 502, by identifying an existing network policy that is to be applied to one or more created pods. The network policy identified at block 502 may be network policy "named-port-policy" illustrated in FIG. 2B.

At block 504, workflow 500 continues by determining source pod(s) for egress traffic based on the network policy's "appliedTo" field. For example, as illustrated at 506 in FIG. 5B, source pods for egress traffic identified by the network policy are pods with the label "env: prod." Per manifest 200, pods 1, 2, and 5 have an environment defined as a production environment (e.g., env: prod). As such, pods 1, 2, and 5 are the only source pods for egress traffic identified by the network policy.

At block 506, workflow 500 continues by determining destination pod(s) for egress traffic based on the network policy's (1) "podSelector" sub-field and the (2) "ports" sub-field within the "rules" field for "direction: out" traffic. For example, as illustrated at 506 in FIG. 5B, destination pods for egress traffic identified by the network policy are pods with the label "env: db" and which have a container associated with a port with port name "secured." Per manifest 200, only pods 4 and 6 have an environment defined as a database environment (e.g., env: db) and have a container associated with a port with port name "secured." As such, pods 4 and 6 are the only destinations pods identified by the network policy for the egress rules. This means that traffic from pods 1, 2, and 5 is the only traffic permitted into pods 4 and 6, where that traffic has a destination port number assigned a port name "secured" per the policy.

At block 508, workflow 500 continues by determining whether at least two of the destination pods have a container associated with a port with a same port name. In this example, the fourth port of the fourth container of pod 4 and the sixth port of sixth container of pod 6 share a same port name "secured." Accordingly, at block 508, it is determined that at least two of the destination pods have containers associated with ports with a same port name.

Accordingly, at block 512, workflow 500 continues by creating an IP-set group for each of the destination pods having containers associated with a same port name and a same port number. Further, at block 514, workflow 500 continues by creating an IP-set group for each of the destination pods having containers associated with a unique port name. For example, although the fourth port and the sixth port share a common port name, the ports are not the same (e.g., the port numbers are not the same). In particular, the fourth port is port number "8080," and the sixth port is port number "44." As such, at blocks 512 and 514, two IP-set groups are created. A first IP-set group (e.g., shown as policy group 5 in FIG. 5C) may include the fourth port (e.g., port number "8080" with port name "secured"), while a second IP-set group (e.g., shown as policy group 6 in FIG. 5C) may include only the fourth port (e.g., port number "44" with port name "secured").

Accordingly, as shown in FIG. 5C, when the network policy is applied, two egress rules may be created. The first egress rule may permit egress traffic from policy group 4 to policy group 5 on TCP port 8080, where policy group 4 includes pods 1, 2, and 5 (e.g., the source pods) and policy group 5 includes pod 4 (e.g., one of the destination pods). The second ingress rule may permit egress traffic from policy group 4 to policy group 6 on TCP port 44, where policy group 4 includes pods 1, 2, and 5 (e.g., the source pods) and policy group 6 includes pod 6 (e.g., one of the destination pods).

Although not illustrated by the provided example, in some cases at block 506 in FIG. 5A, only one destination pod is determined for egress traffic or multiple destination pods are determined for egress traffic but none of the pods have containers associated with ports which share a same port name. As such, at block 508, workflow 500 determines that at least two of the destination pods are not associated with a same port name and instead proceeds to block 510, where an IP-set group for each of the destination pod(s) associated with a unique port name is created.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities- usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method for implementing a network policy in a software defined networking (SDN) environment, comprising:
receiving a manifest defining a plurality of pods in a namespace, wherein:
for a first pod, the manifest defines a first environment value for an environment of the first pod, a first port number for a first container of the first pod, and a name for the first port number defined for the first container of the first pod;
for a second pod, the manifest defines the first environment value for an environment of the second pod, a second port number for a second container of the second pod, and the name for the second port number defined for the second container of the second pod; and
the manifest defines a security policy applied to a third pod, the security policy defining a first egress policy indicating the first environment value and the name;
creating, based on the manifest indicating that the first port number is different than the second port number and that the first port number and the second port number share the name, separate egress firewall rules for the first pod and the second pod, the separate egress firewall rules comprising:

a first egress firewall rule to apply to packets with the third pod as a source, the first pod as a destination, and the first port number as a destination port; and a second egress firewall rule to apply to packets with the third pod as a source, the second pod as a destination, and the second port number as a destination port; and configuring a firewall with the first egress firewall rule and the second egress firewall rule.

2. The method of claim 1, wherein:

for a fourth pod, the manifest defines the first environment value for an environment of the fourth pod, the first port number for a fourth container of the fourth pod, and the name for the first port number defined for the fourth container of the fourth pod; and the first egress firewall rule is further defined to apply to packets with the fourth pod as a destination.

3. The method of claim 1, wherein configuring the firewall comprises configuring a virtual switch in a communication path of at least one of the first pod, the second pod, or the third pod.

4. The method of claim 1, wherein:

for the third pod, the manifest defines a second environment value for an environment of the third pod, the second port number for a third container of the third pod, and the name for the second port number defined for the third container of the third pod;

the security policy defines a first ingress policy indicating the first environment value and the name, and further comprising:

creating, based on the first ingress policy, a first ingress firewall rule to apply to packets with the first pod as a source, the third pod as a destination, and the second port number as a destination port, wherein the first ingress firewall rule is further configured to apply to packets with the second pod as a source, the third pod as a destination, and the second port number as a destination port.

5. The method of claim 4, wherein the security policy is further applied to a fourth pod, wherein, for the fourth pod, the manifest defines the second environment value for the environment of the fourth pod, a third port number for a fourth container of the fourth pod, and the name for the third port number defined for the fourth container of the fourth pod, and further comprising:

creating, based on the first ingress policy, a second ingress firewall rule to apply to packets with the first pod as a source, the fourth pod as a destination, and the third port number as a destination port, wherein the second ingress firewall rule is further configured to apply to packets with the second pod as a source, the fourth pod as a destination, and the third port number as a destination port.

6. The method of claim 1, wherein:

the first pod comprises a plurality of containers running in a first virtual machine (VM) on a host computer;

the host computer executes a hypervisor that that abstracts processor, memory, storage, and networking resources of a hardware platform of the host computer for the first VM;

the hypervisor comprises a hypervisor virtual switch that, along with a plurality of additional hypervisor virtual switches in a plurality of additional hypervisors running on a plurality of additional host computers, implements a logical switch in the SDN environment;

the first VM comprises a VM virtual switch;

the hypervisor virtual switch comprises a first plurality of virtual ports including a first virtual port associated with the VM virtual switch; and the VM virtual switch comprises a second plurality of virtual ports including a second virtual port associated with a container networking interface (CNI) plugin attached to the first pod.

7. The method of claim 1, wherein configuring the firewall comprises configuring a virtual network interface card in a communication path of at least one of the first pod, the second pod, or the third pod.

8. A system comprising:

one or more processors; and at least one memory, the one or more processors and the at least one memory configured to:

receive a manifest defining a plurality of pods in a namespace, wherein:

for a first pod, the manifest defines a first environment value for an environment of the first pod, a first port number for a first container of the first pod, and a name for the first port number defined for the first container of the first pod;

for a second pod, the manifest defines the first environment value for an environment of the second pod, a second port number for a second container of the second pod, and the name for the second port number defined for the second container of the second pod; and the manifest defines a security policy applied to a third pod, the security policy defining a first egress policy indicating the first environment value and the name;

create, based on the manifest indicating that the first port number is different than the second port number and that the first port number and the second port number share the name, separate egress firewall rules for the first pod and the second pod, the separate egress firewall rules comprising:

a first egress firewall rule to apply to packets with the third pod as a source, the first pod as a destination, and the first port number as a destination port; and a second egress firewall rule to apply to packets with the third pod as a source, the second pod as a destination, and the second port number as a destination port; and configure a firewall with the first egress firewall rule and the second egress firewall rule.

9. The system of claim 8, wherein:

for a fourth pod, the manifest defines the first environment value for an environment of the fourth pod, the first port number for a fourth container of the fourth pod, and the name for the first port number defined for the fourth container of the fourth pod; and the first egress firewall rule is further defined to apply to packets with the fourth pod as a destination.

10. The system of claim 8, wherein to configure the firewall comprises to configure a virtual switch in a communication path of at least one of the first pod, the second pod, or the third pod.

11. The system of claim 8, wherein:

for the third pod, the manifest defines a second environment value for an environment of the third pod, the second port number for a third container of the third pod, and the name for the second port number defined for the third container of the third pod;

the security policy defines a first ingress policy indicating the first environment value and the name, and the one or more processors and the at least one memory are further configured to:
  create, based on the first ingress policy, a first ingress firewall rule to apply to packets with the first pod as a source, the third pod as a destination, and the second port number as a destination port, wherein the first ingress firewall rule is further configured to apply to packets with the second pod as a source, the third pod as a destination, and the second port number as a destination port.

12. The system of claim 11, wherein the security policy is further applied to a fourth pod, wherein, for the fourth pod, the manifest defines the second environment value for the environment of the fourth pod, a third port number for a fourth container of the fourth pod, and the name for the third port number defined for the fourth container of the fourth pod, and the one or more processors and the at least one memory are further configured to:
  create, based on the first ingress policy, a second ingress firewall rule to apply to packets with the first pod as a source, the fourth pod as a destination, and the third port number as a destination port, wherein the second ingress firewall rule is further configured to apply to packets with the second pod as a source, the fourth pod as a destination, and the third port number as a destination port.

13. The system of claim 8, wherein:
the first pod comprises a plurality of containers running in a first virtual machine (VM) on a host computer;
the host computer executes a hypervisor that that abstracts processor, memory, storage, and networking resources of a hardware platform of the host computer for the first VM;
the hypervisor comprises a hypervisor virtual switch that, along with a plurality of additional hypervisor virtual switches in a plurality of additional hypervisors running on a plurality of additional host computers, implements a logical switch in the SDN environment;
the first VM comprises a VM virtual switch;
the hypervisor virtual switch comprises a first plurality of virtual ports including a first virtual port associated with the VM virtual switch; and
the VM virtual switch comprises a second plurality of virtual ports including a second virtual port associated with a container networking interface (CNI) plugin attached to the first pod.

14. The system of claim 8, wherein to configure the firewall comprises to configure a virtual network interface card in a communication path of at least one of the first pod, the second pod, or the third pod.

15. A non-transitory computer-readable medium comprising instructions that, when executed by one or more processors of a computing system, cause the computing system to perform operations for implementing a network policy in a software defined networking (SDN) environment, the operations comprising:
  receiving a manifest defining a plurality of pods in a namespace, wherein:
    for a first pod, the manifest defines a first environment value for an environment of the first pod, a first port number for a first container of the first pod, and a name for the first port number defined for the first container of the first pod;
    for a second pod, the manifest defines the first environment value for an environment of the second pod, a second port number for a second container of the second pod, and the name for the second port number defined for the second container of the second pod; and
  the manifest defines a security policy applied to a third pod, the security policy defining a first egress policy indicating the first environment value and the name;
  creating, based on the manifest indicating that the first port number is different than the second port number and that the first port number and the second port number share the name, separate egress firewall rules for the first pod and the second pod, the separate egress firewall rules comprising:
    a first egress firewall rule to apply to packets with the third pod as a source, the first pod as a destination, and the first port number as a destination port; and
    a second egress firewall rule to apply to packets with the third pod as a source, the second pod as a destination, and the second port number as a destination port; and configuring a firewall with the first egress firewall rule and the second egress firewall rule.

16. The non-transitory computer-readable medium of claim 15, wherein:
for a fourth pod, the manifest defines the first environment value for an environment of the fourth pod, the first port number for a fourth container of the fourth pod, and the name for the first port number defined for the fourth container of the fourth pod; and
the first egress firewall rule is further defined to apply to packets with the fourth pod as a destination.

17. The non-transitory computer-readable medium of claim 15, wherein configuring the firewall comprises configuring a virtual switch in a communication path of at least one of the first pod, the second pod, or the third pod.

18. The non-transitory computer-readable medium of claim 15, wherein:
for the third pod, the manifest defines a second environment value for an environment of the third pod, the second port number for a third container of the third pod, and the name for the second port number defined for the third container of the third pod;
the security policy defines a first ingress policy indicating the first environment value and the name, and further comprising:
  creating, based on the first ingress policy, a first ingress firewall rule to apply to packets with the first pod as a source, the third pod as a destination, and the second port number as a destination port, wherein the first ingress firewall rule is further configured to apply to packets with the second pod as a source, the third pod as a destination, and the second port number as a destination port.

19. The non-transitory computer-readable medium of claim 18, wherein the security policy is further applied to a fourth pod, wherein, for the fourth pod, the manifest defines the second environment value for the environment of the fourth pod, a third port number for a fourth container of the fourth pod, and the name for the third port number defined for the fourth container of the fourth pod, and further comprising:
  creating, based on the first ingress policy, a second ingress firewall rule to apply to packets with the first pod as a source, the fourth pod as a destination, and the third port number as a destination port, wherein the second ingress firewall rule is further configured to apply to packets with the second pod as a source, the fourth pod as a destination, and the third port number as a destination port.

20. The non-transitory computer-readable medium of claim 15, wherein:
   the first pod comprises a plurality of containers running in a first virtual machine (VM) on a host computer;
   the host computer executes a hypervisor that that abstracts processor, memory, storage, and networking resources of a hardware platform of the host computer for the first VM;
   the hypervisor comprises a hypervisor virtual switch that, along with a plurality of additional hypervisor virtual switches in a plurality of additional hypervisors running on a plurality of additional host computers, implements a logical switch in the SDN environment;
   the first VM comprises a VM virtual switch;
   the hypervisor virtual switch comprises a first plurality of virtual ports including a first virtual port associated with the VM virtual switch; and
   the VM virtual switch comprises a second plurality of virtual ports including a second virtual port associated with a container networking interface (CNI) plugin attached to the first pod.

* * * * *